(12) United States Patent
Ikeshita et al.

(10) Patent No.: US 11,325,798 B2
(45) Date of Patent: May 10, 2022

(54) FEEDING DEVICE AND SHEET PROCESSING DEVICE WITH THE SAME

(71) Applicant: DUPLO SEIKO CORPORATION, Kinokawa (JP)

(72) Inventors: Hiroki Ikeshita, Kinokawa (JP); Masayasu Matsumoto, Kinokawa (JP)

(73) Assignee: DUPLO SEIKO CORPORATION, Kinokawa (JP)

( * ) Notice: Subject to any disclaimer, the term of this patent is extended or adjusted under 35 U.S.C. 154(b) by 47 days.

(21) Appl. No.: 16/104,241

(22) Filed: Aug. 17, 2018

(65) Prior Publication Data

US 2019/0071269 A1   Mar. 7, 2019

(30) Foreign Application Priority Data

Sep. 7, 2017   (JP) .............................. JP2017-172346

(51) Int. Cl.
*B65H 3/12*     (2006.01)
*H04N 1/00*     (2006.01)
*B65H 7/06*     (2006.01)

(52) U.S. Cl.
CPC ............. *B65H 3/124* (2013.01); *B65H 3/128* (2013.01); *B65H 7/06* (2013.01); *H04N 1/0061* (2013.01); *H04N 1/00729* (2013.01); *B65H 2511/10* (2013.01); *B65H 2511/242* (2013.01); *B65H 2511/414* (2013.01); *B65H 2511/515* (2013.01); *B65H 2513/10* (2013.01); *B65H 2513/41* (2013.01); *B65H 2515/10* (2013.01)

(58) Field of Classification Search
CPC ................................ B65H 3/128; B65H 3/124
See application file for complete search history.

(56) References Cited

U.S. PATENT DOCUMENTS

| | | | | |
|---|---|---|---|---|
| 3,641,931 A | * | 2/1972 | Hickox | B65H 29/58 101/93 |
| 4,893,804 A | * | 1/1990 | Sasage | B65H 3/124 271/11 |

(Continued)

FOREIGN PATENT DOCUMENTS

| | | |
|---|---|---|
| DE | 103 15 648 A1 | 10/2004 |
| JP | 62-259944 | 11/1987 |

(Continued)

OTHER PUBLICATIONS

Machine translation of JP2004-269256. (Year: 2004).*

(Continued)

*Primary Examiner* — Thomas A Morrison
(74) *Attorney, Agent, or Firm* — Buchanan Ingersoll & Rooney PC

(57) ABSTRACT

A feeding device comprises a suction feeding unit having a belt for feeding a sheet in a suction state and a belt driving unit, a sheet detection sensor, and a control unit. The control unit controls the belt drive unit so as to feed the sheet in a feeding direction at a first speed. If the sheet does not arrive at the sheet detection sensor, the control unit controls the belt drive unit so as to execute a low-speed feeding of moving the belt in the feeding direction at a second speed lower than the first speed or so as to execute a reverse feeding of moving the belt in a reverse feeding direction opposite to the feeding direction.

19 Claims, 9 Drawing Sheets

(56) References Cited

U.S. PATENT DOCUMENTS

| | | | |
|---|---|---|---|
| 4,958,824 A * | 9/1990 | Willits | B65H 3/0833 |
| | | | 271/103 |
| 5,052,675 A | 10/1991 | Shehata et al. | |
| 5,394,222 A | 2/1995 | Genovese | |
| 6,834,853 B2 | 12/2004 | Trovinger et al. | |
| 7,748,320 B2 * | 7/2010 | Ikeda | G03G 15/6511 |
| | | | 101/480 |
| 7,748,694 B2 * | 7/2010 | Matsumoto | B65H 7/02 |
| | | | 271/10.03 |
| 7,748,697 B2 | 7/2010 | Fujita | |
| 2005/0253329 A1 | 11/2005 | Morisaki et al. | |
| 2008/0210605 A1 | 9/2008 | Park et al. | |
| 2010/0258407 A1 * | 10/2010 | Krause | B65H 3/5223 |
| | | | 198/443 |
| 2010/0264577 A1 | 10/2010 | Suzuki et al. | |
| 2015/0368054 A1 * | 12/2015 | Kowase | B65H 7/18 |
| | | | 271/258.01 |
| 2019/0055098 A1 * | 2/2019 | Masuda | B65H 9/006 |

FOREIGN PATENT DOCUMENTS

| | | | |
|---|---|---|---|
| JP | 63-27353 | * | 2/1988 |
| JP | 11-301883 A | | 11/1999 |
| JP | 2001-158538 | * | 6/2001 |
| JP | 2004-269256 | * | 9/2004 |
| JP | 2015-016954 A | | 1/2015 |
| JP | 2015196571 A | | 11/2015 |
| JP | 2019-177966 | * | 10/2019 |

OTHER PUBLICATIONS

Machine translation of JP63-27353. (Year: 1988).*
Extended European Search Report issued in corresponding European Patent Application No. 18 189 096.3, dated Feb. 13, 2019 (9 pages).
Office Action issued in corresponding U.S. Appl. No. 16/776,577, dated Dec. 15, 2020, (10 pages).
Office Action issued in corresponding U.S. Appl. No. 16/776,577, dated Mar. 4, 2021, (16 pages).
Official Action issued in corresponding U.S. Appl. No. 16/776,577, dated Jun. 10, 2021 (19 pages).
Notice of Reasons for Refusal issued in corresponding Japanese Patent Application No. 2017-172346, dated May 25, 2021, with English translation (4 pages).
Official Action issued in corresponding U.S. Appl. No. 16/776,577, dated Feb. 22, 2022 (13 pages).

* cited by examiner

FEEDING DEVICE AND SHEET PROCESSING DEVICE WITH THE SAME

BACKGROUND OF THE INVENTION

Field of the Invention

The present disclosure relates to a feeding device for feeding a sheet and a sheet processing device with the same feeding device.

CROSS-REFERENCES TO RELATED APPLICATIONS

The present application claims benefit of priority for Japanese Patent Application No. 2017-172346 filed Sep. 1, 2017 and incorporates an entire description of the same application.

DESCRIPTION OF THE PRIOR ART

A sheet processing device has been well known in which a feeding device separates a sheet one by one by air suction from a sheet bundle stacked on a feeding table and feeds the sheet to execute a variety of processings on the sheet being fed, such as cutting and creasing. An example of such a sheet processing device has been disclosed in Japanese Unexamined Patent Application Publication No. 2015-196571.

SUMMARY OF THE INVENTION

In the device disclosed in Japanese Unexamined Patent Application Publication No. 2015-196571, a suction force in feeding a sheet is controlled by moving a closing member so that a suction opening part at a predetermined location functions depending on a size or thickness of the sheet. However, since a sheet state changes due to various factors and the suction force also changes due to changes in the sheet state, it is difficult to prevent an abnormal state upon feeding of a sheet only by controlling the suction force. Then, there is a problem that a complicated drive mechanism for moving the closing member is required and further, there is another problem that controlling of the drive mechanism is complicated.

Accordingly, a technical problem to be solved of the present disclosure is to provide a feeding device which, if an abnormal state occurs upon feeding of a sheet, can easily recover the abnormal state and a sheet processing device with the same feeding device.

To solve the above-mentioned technical problem, there is provided a feeding device and a sheet processing device with the feeding device.

According to an embodiment of the present invention, there is provided a feeding device comprises a suction feeding unit having a belt for feeding a sheet on a feeding table along a feeding path in a suction state, and a belt drive unit for moving the belt; a sheet detection sensor that is provided in the feeding path in a downstream of the suction feeding unit and detects presence or absence of the sheet; and a control unit for controlling the belt drive unit. The control unit controls the belt drive unit so as to execute a first operation of moving the belt in a feeding direction at a first speed by a belt feeding amount capable of feeding the sheet from the feeding table to the sheet detection sensor. If the first operation is executed and an arrival of the sheet cannot be detected by the sheet detection sensor, the control unit controls the belt drive unit so as to execute a low-speed feeding of moving the belt in the feeding direction at a second speed lower than the first speed by the belt feeding amount or so as to execute a reverse feeding of moving the belt in a reverse feeding direction opposite to the feeding direction by a belt reverse feeding amount capable of feeding the sheet up to the feeding table.

According to the present embodiment, it any abnormal state occurs upon feeding of the sheet, the abnormal state can be easily recovered to a normal state toy feeding of the sheet with a sheet feeding force enhanced by the low-speed feeding or by returning the sheet by a reverse feeding finally to an original feeding start position.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE EMBODIMENTS

Hereinafter, a feeding device 7, a sheet processing device 1 having the same feeding device 7 and a feeding method will be described with reference to the drawings. For convenience of description, a downstream side of a feeding direction F of a sheet 100 is called "forward" or just "downstream side" as described in FIG. 1, etc. An upstream side of the feeding direction F of the sheet 100 is called "backward" or just "upstream side". A reverse direction of the feeding direction F of the sheet 100 is called "reverse feeding direction B". An upside and a downside with respect to a feeding path 10 are called "upside" and "downside", respectively. A sheet width direction (horizontal direction perpendicular to the feeding direction F) is called "left-right direction", and the "left side" and "right side" are defined when viewed from backward of the sheet 100. Further, according to the present disclosure, the sheet 100 includes not only a paper sheet but also a resin sheet.

Entire Structure of a Sheet Processing Device

Figure 1:
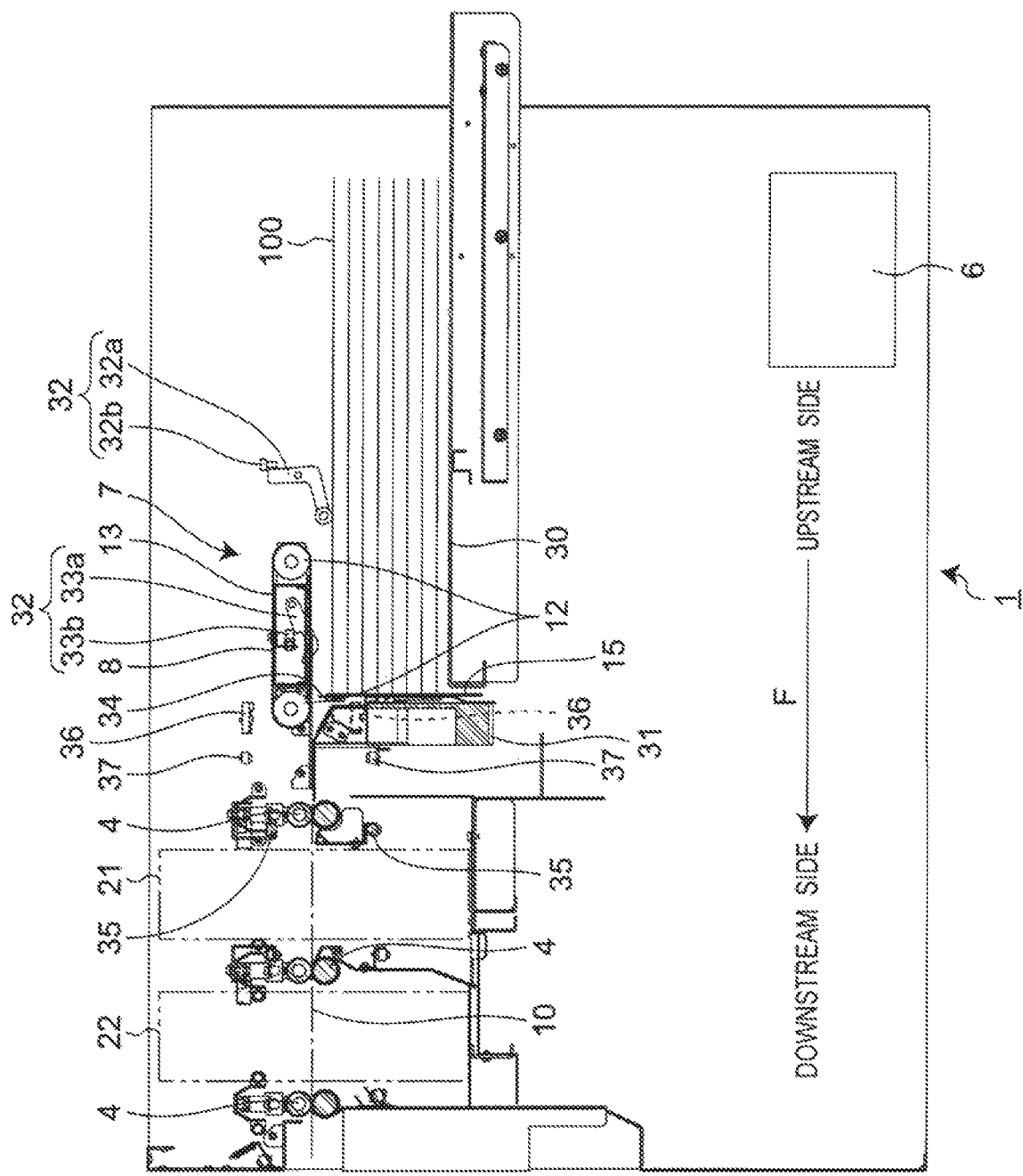
FIG. 1 is a longitudinal sectional view illustrating schematically an entire structure of a sheet processing device according to an embodiment of the present invention.

FIG. 1 is a longitudinal sectional view for explaining schematically an entire configuration of a sheet processing device 3 according to an embodiment of the present invention. The sheet processing device 1 includes a feeding device 7, a first processing unit 21, a second processing unit 22 and a discharge tray (not shown). The feeding device 7 sequentially feeds a sheet one by one in a feeding direction F along a feeding path 10 from the top of a plurality of sheets 100 stacked in the form of a sheet bundle. The first processing unit 21 and the second processing unit 22 operate as a sheet processing unit to apply a predetermined processing to the sheet 100 fed from the feeding device 7, respectively. A plurality of feeding rollers are disposed separately in the feeding path 10 from the feeding device 7 to the discharge tray. Each of the feeding rollers 4 is composed of a pair of roller parts and sequentially feeds the sheet 100 nipped by a pair of the roller parts. A position of the sheet 100 being fed is appropriately detected by various sensors provided in the feeding path 10.

At least the first processing unit 21 and the second processing unit 22 are provided in the feeding path 10 in order from the side of the feeding device 7 (i.e., from the upstream side to the downstream side). The sheet processing device 1 may be provided with the first processing unit 21 and the second processing unit 22 detachably or fixedly. In case where those units are used as an independent unit, they are configured to have a same dimension and shape in appearance so that they can be detachably to any installation place. Further, the first processing unit 21 and the second processing unit 22 are provided with a first processing motor 44 and a second processing motor 45 as a driving means, respectively. In the meantime, the first processing unit 21 and the second processing unit 22 do not mean just only two sheet processing units but are defined as a wider concept including two or more sheet processing units. As the first processing unit 21 and the second processing unit 22, a longitudinal cutting processing unit, a transverse cutting processing unit, a longitudinal folding processing unit, a transverse folding processing unit, a rounding processing unit, an emboss processing unit, a printing unit, a pseudo-adhering unit, a bonding unit, a binding unit, a perforating unit and the like may be exemplified. Depending on the purpose of processing the sheet 100, a necessary processing unit is appropriately selected from these various processing units and a selected processing unit is installed to any appropriate place in the sheet processing unit 1. Further, the sheet processing unit 1 has a trash box for collecting cut chips which are generated upon cutting of the sheet 100 at the bottom part thereof.

Electrical Configuration of Sheet Processing Device

Figure 2:
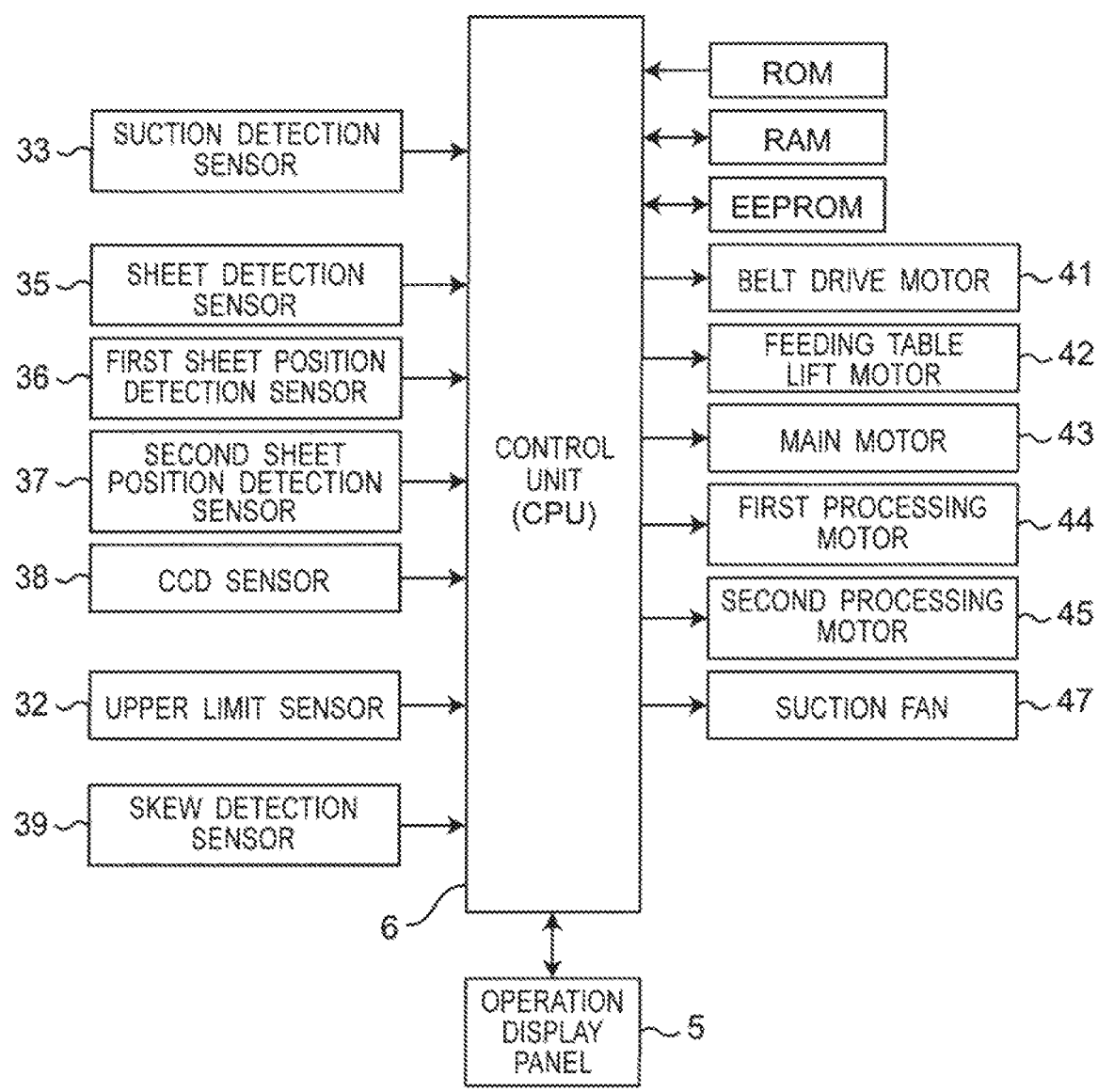
FIG. 2 is a block diagram showing an electrical configuration of the sheet processing device shown in FIG. 1.

FIG. 2 is a block diagram showing an electrical configuration of the sheet processing device 1. The sheet processing device 1 contains a control unit (central processing unit (CPU) 6 which controls various operations of the sheet processing device 1. A variety of memories such as a read-only memory (ROM), a random access memory (RAM) and electrically erasable programmable read-only memory (EEPROM) are connected to the control unit 6. An operation display panel 5 which contains buttons, switches and a display is connected to the control unit 6. A variety of motors such as a belt drive motor (belt drive unit) 41, a feeding table lift motor (lifting drive unit) 42, a main motor 43, a first processing motor 44 and a second processing motor 45 are connected to the control unit 6. A variety of sensors such as a sheet detection sensor 35, a first sheet position detection sensor 36, a second sheet, position detection sensor 37, a CCD sensor 38 and a skew detection sensor 39 are connected to the control unit 6.

The sheet 100 is fed by a belt 13 and a feeding position of the sheet 100 on the feeding path 10 is determined by a rotation amount of the belt, drive motor 41 which moves the belt 13, that is, a belt feeding amount of the belt 13.

The control, unit 6 controls an entire operation of the sheet processing device 1. At the same time, the control unit 6 controls the feeding position of the sheet 100 (i.e., the rotation amount of the belt drive motor 41) and various kinds of components in the first processing unit 21 and the second processing unit 22. The control unit 6 controls setting and registration of information on a variety of processing jobs and notification of error information through the operation display panel 5. The notification of information means visual display on the display of the operation display panel 5 and audio notification through a speaker. The operation display panel 5 contains a start button. And pressing the start button starts a sequence of sheet processing operations. A CCD sensor 38 connected to the control unit 6 reads a barcode or the like formed on the sheet 100 so as to automatically set and register information on the variety of processing jobs.

Configuration of Feeding Device

The feeding device 7 contains a feeding table 30, a suction feeding unit 8 and a separation blowing unit 31. A plurality of the sheets 100 are stacked on the feeding table 30. A front stopper 15 is provided on a front side of the feeding table 30. Further, a separation member 34 is provided at the top end of the front stopper 15. Front ends of the sheets 100 abut against a front end restriction surface 16 of the front stopper 15 to regulate a position of the sheet 100. Consequently, the front ends of the sheets 100 stacked on the feeding table 30 are positioned. The feeding table 30 is electrically lifted up/down by a lift unit which is driven by the feeding table lift motor 42. An upper limit position and a lower limit position of the feeding table 30 are detected by an upper limit sensor 32 and a lower limit sensor, respectively. The upper limit sensor 32 contains, for example, a detection lever 32a and an optical sensor 32b. When a swinging detection lever 32a blocks the optical sensor 32b, the control unit 6 detects that the feeding table 30 has reached a predetermined height (the upper limit position). Further, as these sensors, for example, a limit switch may be used and in this case, it functions as a safety device for an emergency.

The feeding table 30 can be lifted up/down by a lifting means (not shown). When supplying the sheet, the lifting means ascends the feeding table 30 up to a predetermined height which allows an uppermost sheet 100 to be sucked and fed by the suction feeding unit 8. A fan 31 which blows air toward the front ends of the sheets 100 on the feeding table 30 functions as a separation blowing unit, so that the uppermost sheet 100 is separated from the plurality of the stacked sheets 100. That is, the sheet 100 is handled by air blown from the separation blowing unit 31. The separated sheet 100 is sucked to the suction feeding unit 8 and fed by the belt 13. The separation member 34 prevents a sheet 100 located below the uppermost sheet 100 sucked to the suction feeding unit 8 from being fed in the downstream direction together with the uppermost sheet 100. That is, the sheet 100 is separated more accurately by the separation member 34.

The suction feeding unit 8 is provided over a front portion of the feeding table 30. The suction feeding unit 8 includes the belt 13, a pair of belt drive rollers 12, 12, a belt drive motor 41, a suction box (not shown), a suction fan 47 and a suction detection sensor 33.

Depending on a kind, thickness and feeding speed of the sheet 100, the suction feeding unit 8 can be arranged in an inclined state at a predetermined inclination angle with respect to the feeding direction F of the sheet 100 in a plan view. By arranging the suction feeding unit 8 in the inclined state, the sheet 100 can be fed in a state in which a side end of the sheet 100 is kept in contact with a side plate on one side provided on the feeding device 7. The inclination angle is, for example, 0° to 30° and can be adjusted manually or automatically. By arranging the suction feeding unit 8 in the inclined state with the sheet 100 kept in contact with the side plate on one side, the sheet 100 can be prevented from being fed in a skewed state.

The belt 13 is formed in an endless shape and a plurality of the belts 13 are disposed in line in a direction perpendicular to the feeding direction F of the sheet 100. Each belt 13 is wound around each of the pair of the belt drive rollers 12, 12 which are spaced in the back and forth direction while arranged opposite to each other. The sheer 100 is fed by the belt 13 while sucked to the suction box. One of the pair of the belt drive rollers 12 is connected to the belt drive motor 41 via a drive mechanism. When the belt drive motor 41 is driven by the control unit 6, the one of the belt drive rollers 12 rotates so that the belt 13 is circularly traveled while the other of belt drive roller 12 is led to rotate. That is, the control unit 6 controls the belt drive motor 41 so as to move the belt 13 by driving the belt drive motor 41.

The belt drive motor 41 which moves the belt 13 serves as a belt drive unit. The belt drive motor 41 is, for example, a stepping motor, a servo motor or a DC motor. In case of the stepping motor, the belt feeding amount of the belt 13 is determined by a rotation amount proportional to the number of drive pulses. In case of the servo motor, the belt feeding amount of the belt 13 is determined by a rotation amount of an encoder accompanying the servo motor. In case of the DC motor, the belt feeding amount of the belt 13 is determined by a rotation amount of an encoder arranged on an output shaft thereof.

The control unit 6 controls the belt drive motor 41 so as to move the belt 13 in the feeding direction F or in a reverse feeding direction E at a predetermined timing, by a predetermined feeding amount or at a predetermined feeding speed. For example, the control unit 6 controls the belt drive motor 41 so as to move the belt 13 as a normal feeding in the feeding direction F by a predetermined belt feeding amount at a first speed. Further, for example, the control unit 6 controls the belt drive motor 41 so as to move the belt 13 as a low-speed feeding in the feeding direction F by a predetermined belt feeding amount at a second speed which is lower than the first speed. Further, for example, the control unit 6 controls the belt drive motor 41 so as to move the belt 13 as a reverse feeding by a predetermined belt reverse feeding amount at a predetermined third speed.

The second speed mentioned here is lower than the first speed, for example, approximately 25% of the first speed. The predetermined belt feeding amount in the feeding direction F is a feeding amount of the belt 13 which allows the sheet 100 to be fed from a feeding start position at the feeding table 30 to at least the sheet detection sensor 35. Preferably, the predetermined belt feeding amount in the feeding direction F is, for example, a feeding amount of the belt 13 equivalent to twice a distance R between the sheet detection sensor 35 and the front end restriction surface 16 of the front stopper 15 so that the sheet 100 can be fed from the feeding start position up to the feeding roller 4 located between the feeding device 7 and the first processing unit 21. The predetermined belt reverse feeding amount in the reverse feeding direction B is, for example, a reverse feeding amount of the belt 13 equivalent to a distance R between the sheet detection sensor 35 and the front end restriction surface 16 of the front stopper 15 so that the sheet 100 which may be located in the upstream of the sheet detection sensor 35 can be returned to the feeding table 30, that is, the feeding start position. Here, the third speed upon the reverse feeding of the belt 13, for example, lower than the first speed so as to enhance a sheet feeding force upon the reverse feeding.

When the suction fan 47 starts to operate, the internal pressure in the suction box becomes negative. The suction detection sensor 33 detects that the sheet 100 has been sucked to the suction box. The suction detection sensor 33 contains, for example, a swing member 33a and an optical sensor 33b. A lower end of the swing member 33a protrudes downward from the lower surface of the suction box. The optical sensor 33b contains a light emitting element and a light receiving element. When the sheet 100 comes into contact with the swing member 33a, the swing member 33a is pushed up so that it swings. With a swing of the swing member 33a, an upper end of the swing member 33a shields the optical sensor 33b so as to detect that the sheet 100 has been sucked. When the optical sensor 33b passes light, it can be detected that the sheet 100 has not been sucked.

As shown in FIG. 1, a first sheet position detection sensor 36 is provided just in the downstream of the front stopper 16. The first sheer, position detection sensor 36 is a transmission type photosensor in which a light emitting element and a light receiving element are disposed to face each other with the feeding path 10 interposed therebetween. When the sheet 100 shields the first sheet position detection sensor 36, it is detected that the sheet 100 has passed.

In the downstream of the first sheet position detection sensor 36, a sheet detection sensor 35 is provided between the first processing unit 21 and the feeding roller 4 located in the upstream of the first processing unit 21. The sheet detection sensor 35 is a transmission type photosensor in which a light emitting element and a light receiving element are disposed to face each other with the feeding path 10 interposed therebetween. When a front end of the sheet 100 shields the sheet, detection sensor 35, a position of the front end of the sheet 100, namely, an arrival of the sheet 100 can be detected. The position of the front end of the sheet 100 in the upstream of the sheet detection sensor 35 can be calculated and estimated based on whether the sheet 100 is detected by the first sheet position detection sensor 36 and based on a belt feeding amount of the belt 13 from a position of the front end of the sheet 100 when feeding starts (a drive amount or drive time of the belt drive motor 41).

Figure 3:
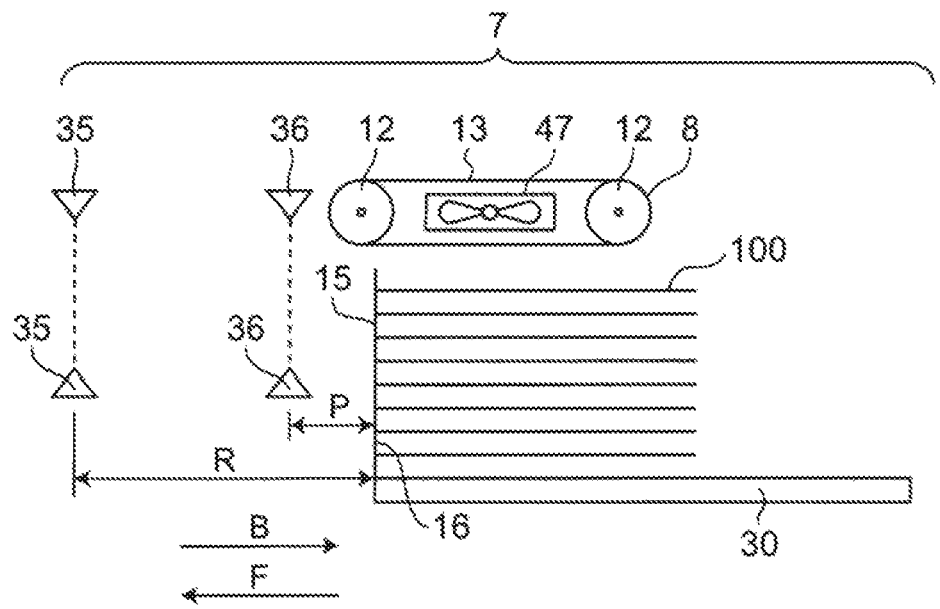
FIG. 3 is a schematic view for explaining an example of reducing a belt reverse feeding amount in a reverse feeding direction.

As shown in FIG. 3, the first, sheet position detection sensor 36 is located at a distance P in the downstream of the feeding direction with respect to the front end restriction surface 16 of the front stopper 15. The distance P between the front end restriction surface 16 and the first sheet position defection sensor 36 in the feeding direction F corresponds to a reduced belt reverse feeding amount P. The sheet detection sensor 35 is located at a distance R in the downstream of the feeding direction with respect to the front end restriction surface 16 of the front stopper 15. The distance R between the front end restriction surface 16 and the sheet detection sensor 35 in the feeding direction F corresponds to a belt reverse feeding amount R. The distance P, that is, the reduced belt reverse feeding amount P is smaller than the distance R, that is, the belt reverse feeding amount R.

Basic Operation of Sheet Processing Device

With reference to FIG. 1, a basic operation of the sheet processing device 1 will be described below.

In the sheet processing device 1 of FIG. 1, information on the variety of processing jobs (size and kind of the sheet 100, arrangement, quantity, dimension and the like of object to be processed) is set and registered using the operation display panel 5 (shown in FIG. 2). In the meantime, instead of this manual setting and registration, the information on the variety of processing jobs may be set and registered by reading a bar code with a CCD sensor 38 (shown in FIG. 2) in cooperation with the manual setting and registration.

In sequence to the above-mentioned setting and registration operation, a following feeding operation is executed. When the separation blowing unit 31 blows air toward the front ends of a plurality of the sheets 100 stacked on the feeding table 30 of the feeding device 7, the sheet 100 is separated from each other. Only the uppermost sheet 100 is sucked to the suction feeding unit 8. Suction of the sheet 100 is detected by the suction detection sensor 33. When the suction detection sensor 33 detects that the sheet 100 has been sucked, the control unit 6 controls the belt driving motor 41 so as to move the belt 13. When the belt 13 is moved, the sheet 100 is fed to the downstream side of the feeding path 10 while sucked to a sheet feeding surface of the suction feeding unit 8.

In sequence to the above-mentioned feeding operation, a following processing operation is executed. The sheet 100 fed along the feeding path 10 is held by the feeding rollers 4 located between the feeding device 7 and the first processing unit 21. The first processing unit 21 and the second processing unit 22 may form a plurality of slit lines, perforations or folds extending parallel to the feeding direction F in the sheet 100 or perforations or folds extending in a horizontal direction perpendicular to the feeding direction F in the sheet 100.

In sequence to the above-mentioned processing operation, a following discharge operation is executed. The processed object subjected to various kinds of processing by the first processing unit 21 and the second processing unit 22 is fed to the downstream and collected in the discharge tray. On the other hand, margin parts or shredded pieces are discharged to the trash box below.

Recovery Operation Upon Sheet Feeding

Figure 6:
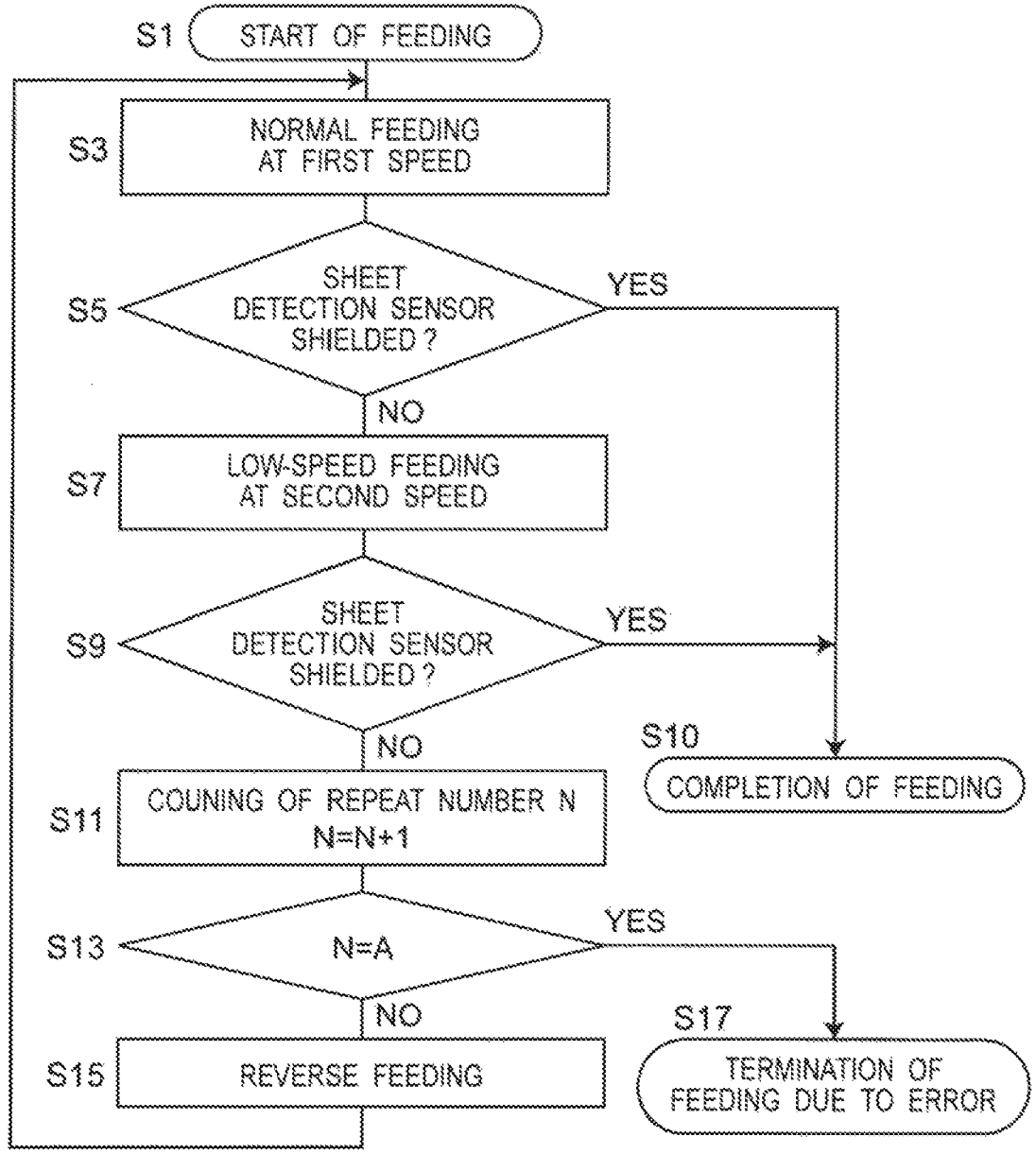
FIG. 6 is a flow chart for explaining a first recovery operation according to the first embodiment.

With reference to FIG. 6, a first recovery operation upon sheet feeding according to a first embodiment will be described. It should be noted that description overlapping with the above-mentioned feeding operation will be omitted.

In FIG. 6, the feeding operation is started in step S1. In step S3, the control unit 6 controls the belt driving motor 41 so that the sheet 100 located at the feeding start position is sucked by the suction feeding unit 3 so as to move the belt 13 in the feeding direction F along the feeding path 10 by a predetermined belt, feeding amount in the feeding direction F along the feeding path 10 at a predetermined first speed (to execute the first operation as the normal feeding). In step S5, the control unit 6 determines whether the sheet detection sensor 35 is shielded by the sheet 100 being fed. If the control unit 6 determines that the sheet detection sensor 33 is shielded (YES in step S3), the control unit 6 regards that the normal feeding has been executed and completes the feeding operation (step S10).

If the control unit 6 determines that the sheet detection sensor 35 is not shielded (NO in step S5), the control unit 6 controls the belt drive motor 41 so as to move the belt 13 in the feeding direction F at the second speed which is lower than the first speed by a predetermined belt feeding amount (to execute the low-speed feeding) (step S7). Because the sheet 100 is slowly fed at the second speed, a friction force between the belt 13 and the sheet 100 is improved so as to improve the sheet feeding force of the suction feeding unit 8. In the meantime, the predetermined belt feeding amount upon the speed feeding is, for example, equal to the predetermined belt feeding amount upon the normal feeding. In the meantime, the predetermined belt feeding amount, upon the low-speed feeding may be different from the predetermined belt feeding amount upon the normal feeding.

In step S9, the control unit 6 determines whether the sheet, detection sensor 35 is shielded by the sheet 100 being fed. If the control unit 6 determines that the sheet detection sensor 35 is shielded (YES in step S9), the control unit 6 regards that the normal feeding has been executed and completes the feeding operation (step S10).

If the control unit 6 determines that the sheet detection sensor 35 is net shielded (NO in step S9), the control unit 6 increments a count number of the repetition number N by 1 (step S1). In step S13, the control unit 6 determines whether the repetition number N has reached a predetermined number A. The predetermined number A is, for example, 3.

If the control unit 6 determines that the repetition number N has not reached the predetermined number A (NO in step S13), the control unit 6 controls the belt drive motor 41 so as to move the belt 13 in the reverse feeding direction B which is opposite to the feeding direction F by the predetermined belt reverse feeding amount (to feed the belt 13 reversely) (Step S15). In this way, the control unit 6 controls the belt drive motor 41 so as to execute the normal feeding (the first operation) in step S3 and a first recovery operation from step S7 to the reverse feeding in step S15. In the meantime, the predetermined belt reverse feeding amount is a belt reverse feeding amount which allows a sheet 100 which may not have reached the sheet detection sensor 35 to return to the feeding table 30 (that is, to return to an original feeding start position). The predetermined belt reverse feeding amount is a reverse feeding amount equivalent to, for example, the distance R between the sheet detection sensor 35 and the front end restriction surface 16 of the front stopper 15. If the low-speed feeding of the sheet 100 fails, the feeding operation can be executed again by returning the sheet 100 to the original feeding start position by the reverse feeding. There is a high possibility that the feeding may be finally completed by executing the feeding operation again.

After the first recovery operation from the low-speed feeding at the second speed in step S7 up to the reverse feeding in step S15 is executed, the control unit 6 controls the belt drive rooter 41 so as to execute the normal feeding (the first operation) in step S3 again. Then, the above-mentioned step S5, step S7, step S9, step S11, step S13 and step S15 are executed in sequence. If the control unit 6 determines that the repetition number N has reached the predetermined number A (YES in step S13), the control unit 6 regards that an abnormal feeding has been executed and then terminates the feeding operation (step S17). Then, the control unit 6 controls the operation display panel 5 so as to display or notify its feeding error.

If in the first operation, the sheet 100 has not been fed up to the position of the sheet detection sensor 35 due to an idle feeding of the sheet 100, the sheet feeding force is enhanced by adopting the lower second speed. However, if the sheet 100 still cannot be fed although the sheet feeding force is enhanced, the first recovery operation in which the sheet is reversely fed to the feeding table 30 or the original feeding start position is executed. Even if any abnormal state occurs in the feeding operation, the abnormal state can be easily recovered to the normal state by returning the sheet 100 to the original feeding start position.

After the first recovery operation from the low-speed feeding at the second speed in step S7 to the reverse feeding in step S15 is executed, the control unit 6 can control the belt drive motor 41 so as to repeat the first recovery operation by repeating the first recovery operation from the low-speed feeding at the second speed in step S7 up to the reverse feeding in step S15.

Reverse Feeding in First Recovery Operation

Figure 7:
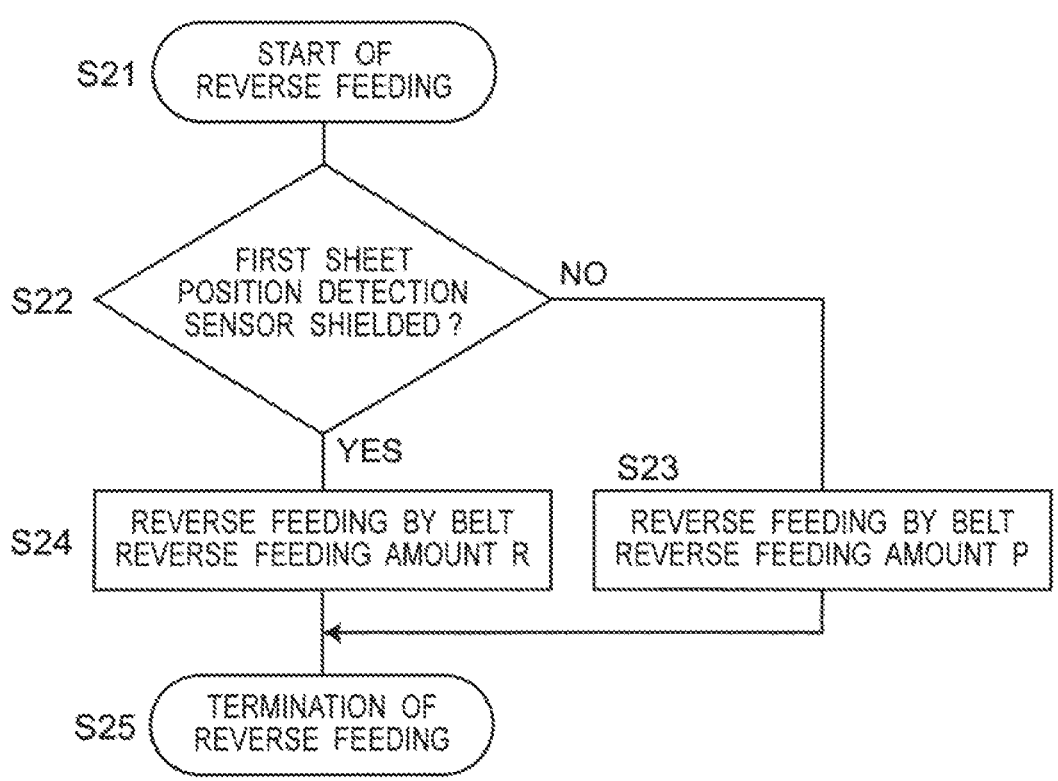
FIG. 7 is a flow chart for explaining a reverse feeding according to a second embodiment.

With reference to FIG. 3 and FIG. 7, the reverse feeding in the first recovery operation according to a second embodiment will be described. The reverse feeding according to the second embodiment corresponds to the reverse feeding in step S15 in FIG. 6.

In FIG. 7, the reverse feeding is started in step S21. In step S22, the control unit 6 determines whether the first sheet position detection sensor 36 is shielded by the sheet 100 being reversely fed.

If the control unit 6 determines that the first sheet position detection sensor 36 is shielded (NO in step S22), the control unit 6 regards that the front end of the sheet 100 is located in the upstream of the first sheet position detection sensor 36 and controls the belt drive motor 41 so as to move the belt 13 in the reverse feeding direction B at a third speed by the reduced belt reverse feeding amount P (to feed the belt 13 reversely). Then, the control unit 6 regards that the reverse feeding is terminated by moving the belt 13 in the reverse feeding direction B by the reduced belt reverse feeding amount P (step S25).

If in step S22, the control unit 6 determines that the first sheet position detection sensor 36 is shielded (YES in step S22), the control unit 6 regards that the front end of the sheet 100 is located in the downstream of the first sheet position detection sensor 36 and controls the belt drive motor 41 so as to move the belt 13 at the third speed, by the belt reverse feeding amount R in the reverse feeding direction 3 (to feed the belt 13 reversely) (step S24). Then, the control unit 6 regards that the reverse feeding is terminated by moving the belt 13 in the reverse feeding direction R by the belt reverse feeding amount R (step S25).

When executing the reverse feeding, a distance necessary for the reverse feeding can be reduced by detecting a position of the front end of the sheet 100 with the first sheet position detection sensor 36, thereby shortening a time required for the reverse feeding.

Figure 4:
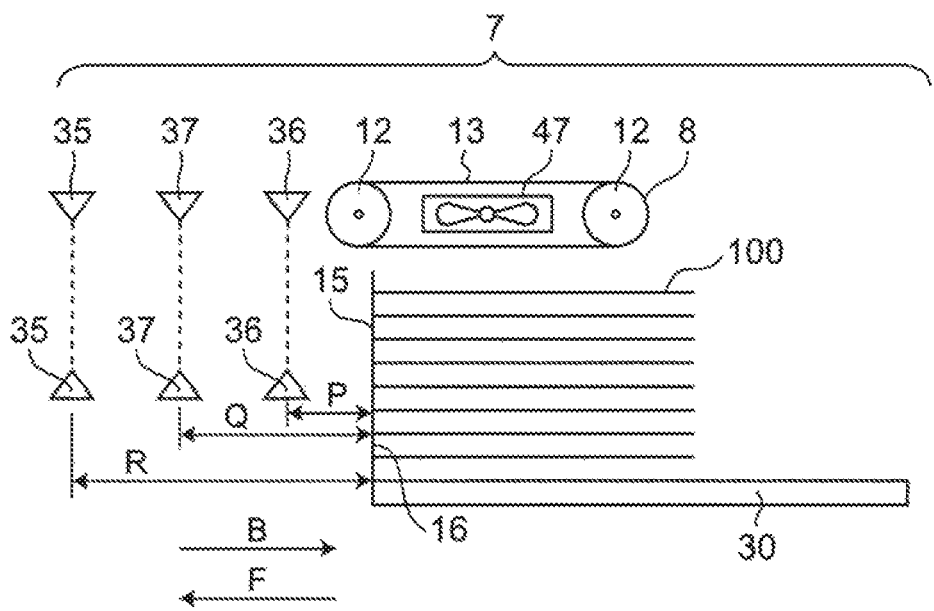
FIG. 4 is a schematic view for explaining another example of reducing a belt reverse feeding amount in a reverse feeding direction.
Figure 8:
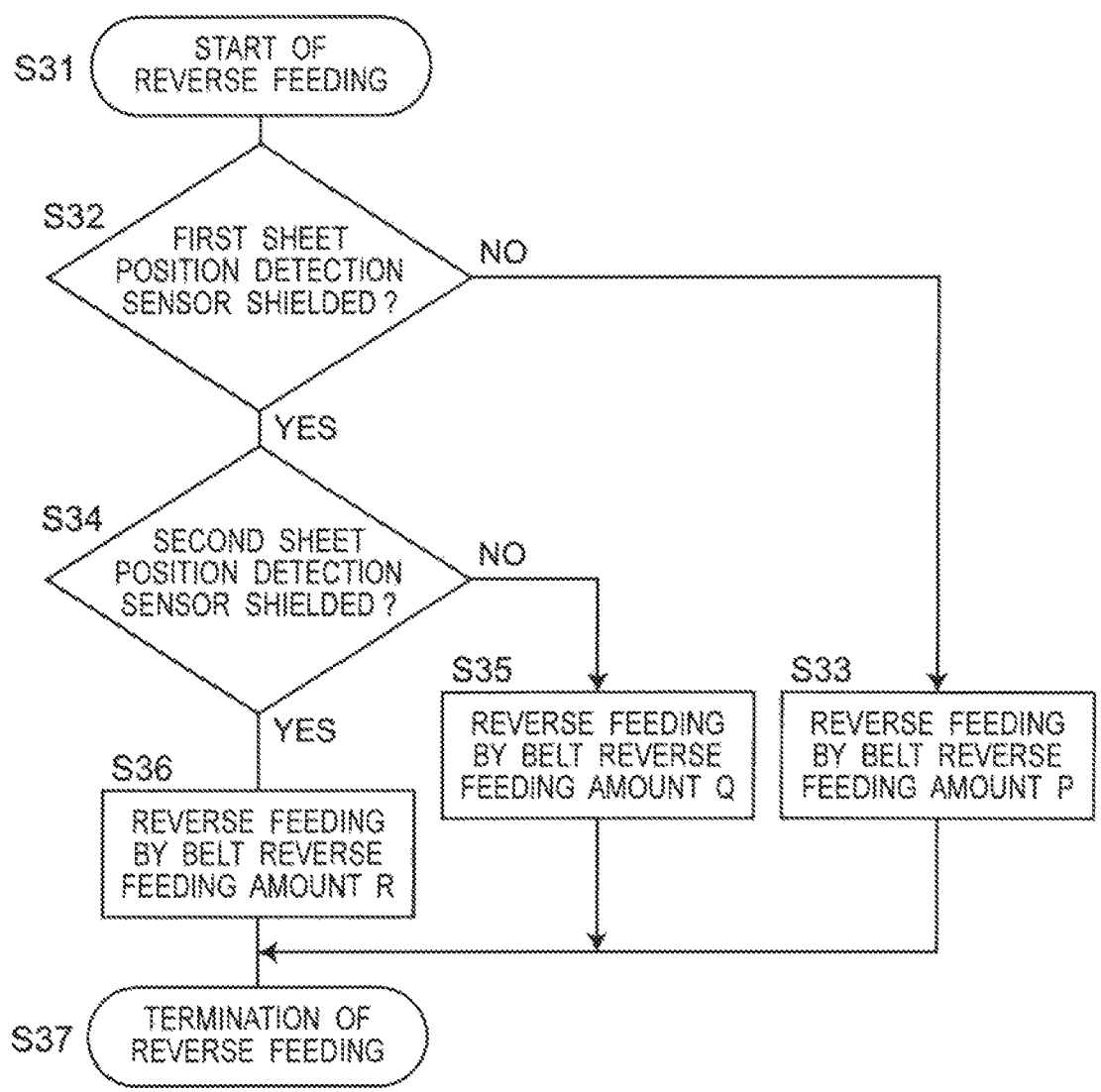
FIG. 8 is a flow chart for explaining a reverse feeding according to a third embodiment.

With reference to FIG. 4 and FIG. 8, a reverse feeding in the first recovery operation according to a third embodiment will be described. The reverse feeding in the first recovery operation according to the third embodiment corresponds to the reverse feeding in step S15 in FIG. 6.

As shown in FIG. 4, a second sheet position detection sensor 37 is provided between the first sheet position detection sensor 36 and the sheet detection sensor 35. The second sheet position detection sensor 37 is a transmission type photosensor in which a light emitting element and a light receiving element are disposed to face each other with the feeding path 10 interposed therebetween. When the sheet 100 shields the first sheet position detection sensor 36, it is detected that the sheet 100 has passed. The second sheet position detection sensor 37 is located at a distance Q in the downstream of the feeding direction with respect to the front end restriction surface 16 of the front stopper 15. The distance Q between the front end restriction surface 16 and the second sheet position detection sensor 37 in the feeding direction F corresponds to a reduced belt reverse feeding amount Q. The distance Q, that is, the reduced belt reverse feeding amount Q is smaller than the belt reverse feeding amount R and larger than the reduced belt reverse feeding amount P.

In FIG. 8, the reverse feeding is started in step S31. In step S32, the control unit 6 determines whether the first sheet position detection sensor 36 is shielded by the sheet 100 being reversely fed. If the control unit 6 determines that the first sheet position detection sensor 36 is not shielded (NO in step S32), the control unit 6 regards that the front end of the sheet 100 is located in the upstream of the first sheet position detection sensor 36 and controls the belt drive motor 41 so as to move the belt 13 in the reverse feeding direction B at the third speed by the reduced belt-reverse feeding amount P (to feed the belt 13 reversely) (step S33). Then, the control unit 6 regards that the reverse feeding is terminated by moving the belt 13 in the reverse feeding direction B by the reduced belt reverse feeding amount P (step S37).

In step S32, if the control unit 6 determines that, the first sheet position detection sensor 36 is shielded (YES in step S32), the control unit 6 proceeds to step S34 where the control unit 6 determines whether the second sheet position sensor 37 is shielded by the sheet 100 being reversely fed (step S34).

If the control unit 6 determines that the second sheet position detection sensor 37 is not shielded (NO in step S34), the control unit 6 regards that the front end of the sheet 100 is located in the downstream of the first sheet position detection sensor 36 and further in the upstream of the second sheet position detection sensor 37. Then, the control unit 6 controls the belt drive motor 41 so as to move the belt 13 at the third speed, by the reduced belt reverse feeding amount Q in the reverse feeding direction B (to feed the belt 13 reversely) (step S35). Then, the control unit 6 regards that the reverse feeding is terminated by moving the belt 13 in the reverse feeding direction B by the reduced belt reverse feeding amount Q (step S37).

In step S34, if the control unit 6 determines that the second sheet position detection sensor 37 is shielded (YES in step S34), the control unit 6 regards that the front end of the sheet 100 is located in the downstream of the second sheet position detection sensor 37. Then, the control unit 6 controls the belt drive motor 41 so as to move the belt 13 at the third speed, by the belt reverse feeding amount R in the reverse feeding direction B (to feed the belt 13 reversely) (step S36). Then, the control unit 6 regards that the reverse feeding is terminated by moving the belt 13 in the reverse feeding direction B by the belt reverse feeding amount P (step S37).

When executing the reverse feeding, a distance necessary for the reverse feeding can be further reduced by finely detecting a position of the front end of the sheet 100 with the second sheet position detection sensor 37 as well as the first sheet position detection sensor 36, thereby further shortening a time required for the reverse feeding.

Figure 9:
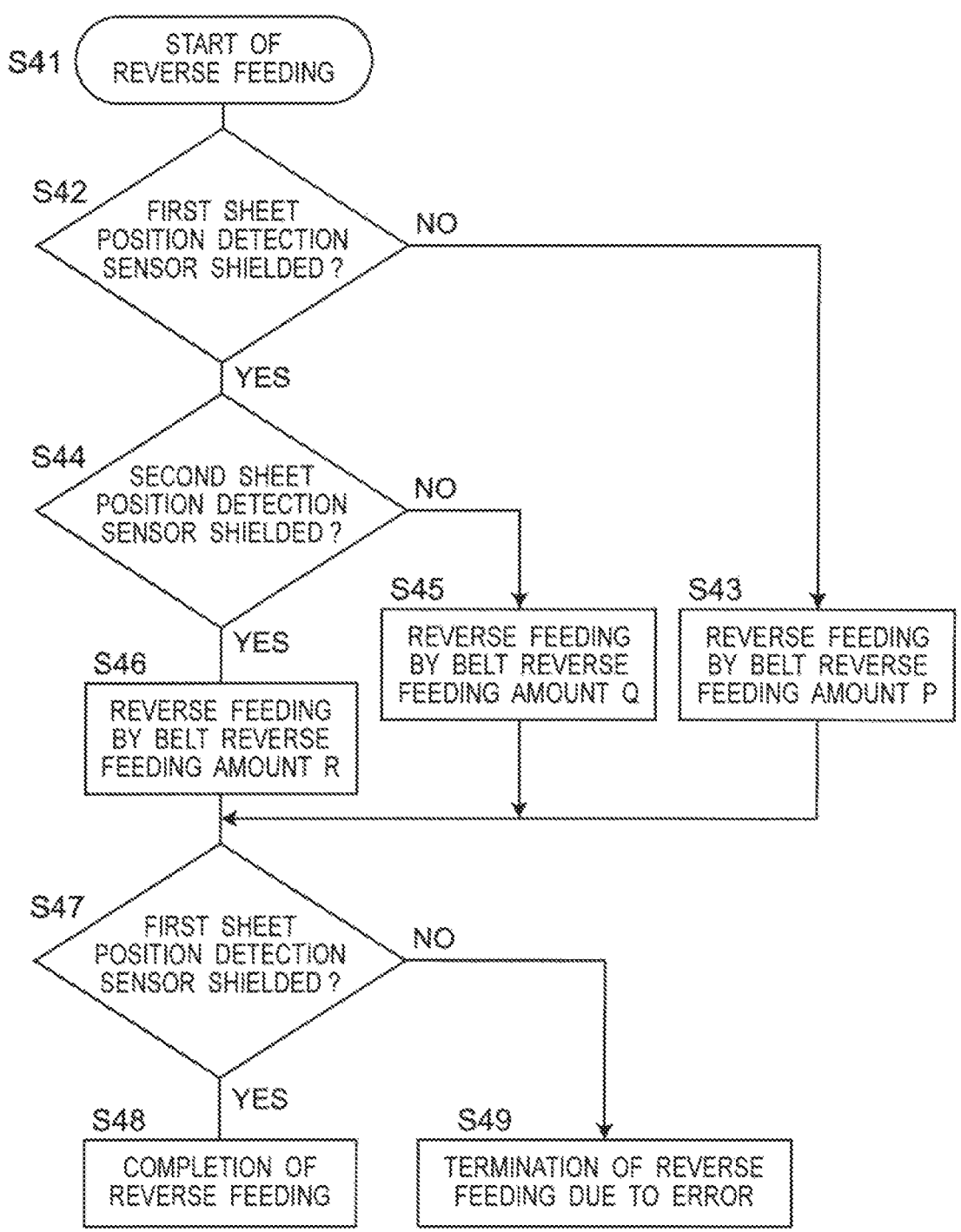
FIG. 9 is a flow chart for explaining a reverse feeding according to a fourth embodiment.

With reference to FIG. 9, a reverse feeding in the first recovery operation according to a fourth embodiment will be described.

In FIG. 9, the reverse feeding is started in step S41. In step S42, the control unit 6 determines whether the first sheet position detection sensor 36 is shielded by the sheet 100 being reversely fed. If the control unit 6 determines that the first sheet position detection sensor 36 is not shielded (NO in step S42), the control unit 6 regards that the front end of the sheet 100 is located in the upstream of the first sheet position detection sensor 36. Then, the control unit 6 controls the belt drive motor 41 so as to move the belt 13 in the reverse feeding direction B at the third speed by the reduced belt reverse feeding amount P (to feed the belt 13 reversely) (step S43).

In step S42, if the control unit 6 determines that the first sheet position detection sensor 36 is shielded (YES in step S42), the control unit 6 proceeds to step S44 where the control unit 6 determines whether the second sheet position sensor 37 is shielded by the sheet 100 being reversely fed (step S44).

If the control unit 6 determines that the second sheet position detection sensor 37 is not shielded (NO in step S44), the control unit 6 regards that the front end of the sheet 100 is located in the downstream of the first sheet position detection sensor 36 and further in the upstream of the second sheet position detection sensor 37. Then, the control unit 6 controls the belt drive motor 41 so as to move the belt 13 at the third speed, by the reduced belt reverse feeding amount Q in the reverse feeding direction B (to feed the belt 13 reversely) (step S45).

In step S44, if the control unit 6 determines that the second sheet position detection sensor 37 is shielded (YES in step S44), the control unit 6 regards that the front end of the sheet 100 is located in the downstream of the second sheet position detection sensor 37. Then, the control unit 6 controls the belt drive motor 41 so as to move the belt 13 at the third speed, by the belt reverse feeding amount R in the reverse feeding direction B (to feed the belt 13 reversely) (step S46). In the meantime, the reduced belt reverse feeding amount Q is smaller than the belt reverse feeding amount R and larger than the reduced belt reverse feeding amount P.

In step S47, the control unit 6 reversely feeds the sheet 100 by moving the belt 13 by the reduced belt reverse feeding amount P, the reduced belt reverse feeding amount Q or the belt reverse feeding amount R in the reverse feeding direction B, and then, the control unit 6 determines whether the first sheet position detection sensor 36 passes light.

If the control unit 6 determines that the first sheet position detection sensor 36 is not shielded (NO in step S47), the control unit 6 regards that the front end of the sheet 100 is located in the downstream of the first sheet position detection sensor 36 (that is, the sheet has not returned to the original feeding start position) and terminates as the reverse feeding due to an error (step S49).

In step S47, if the control unit 6 determines that the first sheet position detection sensor 36 passes light (YES in step S47), the control unit 6 regards that the front end of the sheet 100 is located in the upstream of the first sheet position detection sensor 36 (that is, the sheet has returned to the original feeding start position) and completes the reverse feeding (step S48).

After feeding the sheet 100 reversely by moving the belt 13 by the reduced belt reverse, feeding amount P, the reduced belt reverse amount Q or the belt reverse feeding amount R, presence or absence of the sheet 100 is detected with the first sheet position detection sensor 36 nearest the feeding table 30. Consequently, it can be easily determined whether the sheet 100 has returned to the original feeding start position.

In the meantime, in case of NO in step S42, the first sheet position detection sensor 36 passes light even before feeding the sheet 100 reversely. Thus, after feeding the sheet 100 reversely by the reduced belt reverse feeding amount P in step S43, it is permissible to directly proceed to step S48 without determining whether the first sheet position detection sensor 36 passes light and then complete the reverse feeding.

Figure 10:
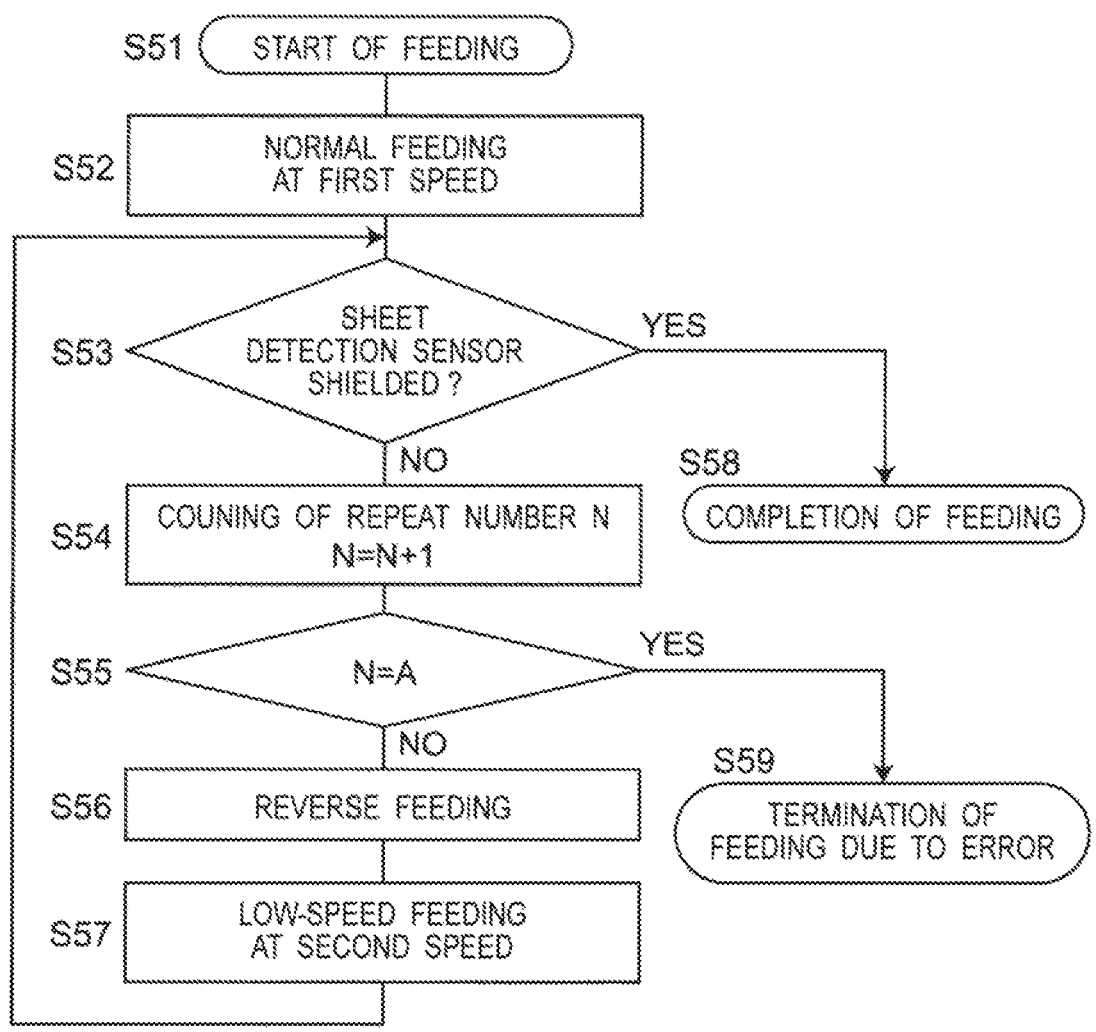
FIG. 10 is a flow chart for explain a second recovery operation according to a fifth embodiment.

Next, with reference to FIG. 10, a second recovery operation upon sheet feeding according to a fifth embodiment will be described. It should be noted that description overlapping with the above-mentioned first recovery operation will be omitted.

The second recovery operation according to the fifth embodiment is characterized by executing the following.

That is, the feeding operation is started in step S51 compared with the first recovery operation. Then, the normal feeding at the first speed (first operation) is executed (step S52), and when an arrival of the sheet 100 cannot be detected (NO in step S53), the reverse feeding is executed (step S56). After that, the low-speed feeding at the second speed is executed (step S57).

That is, when the first operation is executed and an arrival of the sheet 100 cannot be detected by the sheet detection sensor 35, the control unit 6 controls the belt drive motor 41 so as to execute the second recovery operation of moving the belt 13 in the reverse feeding direction B by the belt reverse amount R which is capable of feeding the sheet 100 in the reverse feeding direction B opposite to the feeding direction F to the feeding table 30 and further moving the belt 13 at the second speed lower than the first speed by the belt feeding amount R. In the meantime, if the control unit 6 determines that, the sheet detection sensor 35 is shielded (YES in step S53), the control unit 6 regards that the normal feeding is executed and then completes the feeding operation (step S58).

Unless the sheet 100 has been fed to the sheet detection sensor 35 due to the idle feeding or the like in this way, the sheet 100 is reversely fed to the feeding table 30 or the original feeding start position. Then, the sheet 100 is fed from the original feeding start position at the lower second speed in the feeding direction F, thereby enhancing the sheet feeding force. Consequently, the abnormal state upon feeding of the sheet 100 is recovered to the normal state thereby increasing a possibility that the feeding of the sheet 100 may be finally completed.

In the meantime, in the second recovery operation according to the fifth embodiment, unless an arrival of the sheet 100 can be detected even if the sheet 100 is fed at the lower second speed, the sheet 100 may be reversely fed and returned to the feeding table 30 or the original feeding start position.

In the second recovery operation according to the fifth embodiment, the control unit 6 can control the belt drive motor 41 so as to repeat the second recovery operation. That is, steps (step S54 and step S55) of determining the repetition number N may be provided between the step (step S53) of determining whether the sheet detection sensor 35 is shielded and the step (step S56) of the reverse feeding. In this case, if the control unit 6 determines that the sheet detection sensor 35 is not shielded (NO in step S53), the control unit 6 increments the count number of the repetition number N by 1 (step S54). In step S55, the control unit 6 determines whether the repetition number N has reached a predetermined number A. The predetermined number A is, for example, 3. If the control unit 6 determines that the repetition number N has not reached the predetermined number A (NO in step S55), the control unit 6 controls the belt drive motor 41 so as to feed the sheet 100 reversely (step S56) and after that, move the belt 13 slowly at the second speed (step S57). If the control unit 6 determines that the repetition number N has reached the predetermined number A (YES in step S55), the control unit 6 regards that the abnormal feeding is executed and terminates the feeding operation (step S59).

Like the first recovery operation according to the second embodiment (shown in FIG. 7), it is permissible to detect the front end of the sheet 100 with the first sheet position detection sensor 36 upon the reverse feeding. This configuration can reduce a distance necessary for the reverse feeding.

Like the first recovery operation according to the third embodiment (shown in FIG. 8), it is permissible to detect, the front end of the sheet 100 more finely with the second sheet position detection sensor 37 as well as the first sheet position detection sensor 36 upon the reverse feeding. This configuration can reduce a distance necessary for the reverse feeding thereby further shortening a time required for the reverse feeding.

Further, like the first recovery operation according to the fourth embodiment (shown in FIG. 9), it is permissible to move the belt 13 by the reduced belt reverse feeding amount P, the reduced belt reverse feeding amount Q or the belt reverse amount R to feed the sheet 100 reversely and after that, detect presence or absence of the sheet 100 with the first sheet position detection sensor 36 nearest the feeding table 30. This configuration can easily determine whether the sheet 100 has returned to the original feeding start position.

The control unit 6 can change the second speed upon the low-speed feeding depending on the size and/or basis weight of the sheets 100. For example, when feeding a thin sheet 100 at a low speed, it can be stably fed at the low speed by lowering the second speed compared to a case of feeding a thick sheet 100. That is, the control unit 6 controls the belt drive motor 41 so that the more flexible the sheet 100, the lower the second speed upon the low-speed feeding depending on the size and/or basis weight of the sheet 100.

The control unit 6 can change the third speed upon the reverse feeding depending on the size and/or basis weight of the sheets 100. For example, when feeding the thin sheet 100 reversely, the thin sheet can be reversely fed stably by lowering the third speed compared to the thick sheet 100. That is, the control unit 6 controls the belt drive motor 41 so that the more flexible the sheet 100, the lower the third speed upon the reverse feeding depending on the size and/or basis weight of the sheet 100.

The control unit 6 can control the belt drive motor (belt drive unit) 41 so as to increase the predetermined belt feeding amount as the repetition number of the first recovery operation or the second recovery operation increases. The repetition number of the first recovery operation or the second recovery operation mentioned here means a repetition number of repeating the first operation, the low-speed feeding and then the reverse feeding or a repletion number of repeating the low-speed feeding and then the reverse feeding or a repetition number of repeating the reverse feeding and then the low-speed feeding. According to this control, in case where an arrival of the sheet 100 can be detected with the sheet detection sensor 35 only by increasing the predetermined belt feeding amount a little more, the sheet 100 can be detected with the sheet detection sensor 35 only by feeding the belt 13 a little more. Thus, the reverse feeding becomes unnecessary, thereby a time required for the feeding operation can be shortened. Particularly, this control is effective for a slippery sheet 100.

The control unit 6 can control the feeding table lift motor (lift driving unit) 42 so as to descend the feeding table 30 when moving the belt 13 in the reverse feeding direction B. According to this control, especially when a thick sheet 100 is reversely fed and returned to the feeding table 30 (that is, the original feeding start position), a rear end of the sheet 100 can be prevented from making contact with the upper limit sensor 32.

The control unit 6 can control the feeding table lift motor (lift driving unit) 42 so as to move the belt 13 in the reverse feeding direction B after the feeding table 30 starts to descend. For example, the control unit 6 can control the feeding table lift motor (lift driving unit) 42 so as to move the belt 13 in the reverse feeding direction R after the feeding table 30 has been lowered to a position where the rear end of the sheet 100 can avoid contact with the upper limit sensor 32. According to this control, contact of the rear end of the sheet 100 with the upper limit sensor 32 can be surely avoided.

Depending on the size of the sheet 100, the control unit 6 can control the feeding table lift motor (lift driving unit) 42 about whether or net the feeding table 30 will descend when executing the reverse feeding. If the sheet 100 is an elongated object which is longer than a predetermined length in the feeding direction F, the rear end of the sheet 100 is located in the downstream of the upper limit sensor 32, before the front end of the sheet 100 fed in the feeding direction F reaches a position detected by the sheet detection sensor 35. Thus, according to this control, an operating of descending the feeding table 30 can be omitted, thereby shortening a time required for the reverse feeding. The presence or absence of descent control of the feeding table 30 can be executed by user's arbitrary setting or by detecting the size of the sheet 100.

The control unit 6 can control the separation blowing unit 31 so as to adjust air flow rate of the separation blowing unit 31 depending on a position of the front end of the sheet 100 being fed. Specifically, the control unit 6 controls the separation blowing unit 31 so as to decrease the air flow rate or turn off air blowing in a period until the front end of the sheet 100 reaches the position of the sheet detection sensor 33 after a suction of the sheet 100 is detected by the suction detection sensor 33. According to this control, a sheet 100 following the uppermost sheet 100 is prevented from flying up unnecessarily, thereby preventing double feeding and chain feeding of the sheets. That is, when feeding the sheet 100, the double feeding or the chain feeding can be prevented more easily by stopping the separation of the sheet 100 temporarily.

Figure 5:
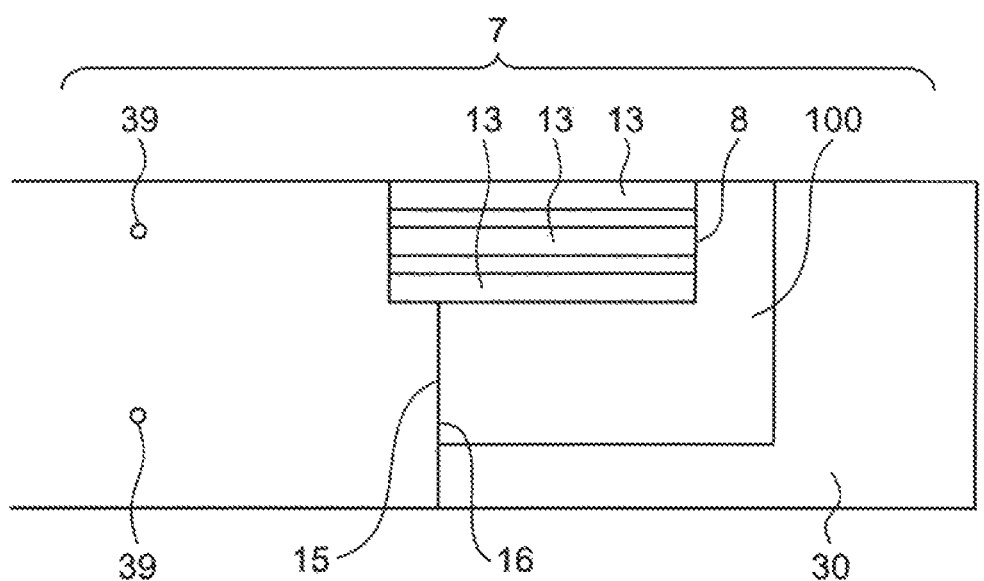
FIG. 5 is a schematic view for explaining a skew detection of a sheet.

Further, as shown in FIG. 5, the feeding device 7 includes the suction feeding unit 3 having the belt 13 for feeding the sheet 100 along the feeding path 10 by sucking the sheet 100 on the feeding table 30 and the belt drive motor (belt drive unit) 41 for moving the belt 13, the skew detection sensor 39 which is provided in the feeding path 10 in the downstream of the suction feeding unit 8 in order to detect the presence or absence of a skew feeding of the sheet 100 and the control unit 6 for controlling the belt drive motor (belt drive unit) 41.

The skew detection sensor 39 is a transmission type photosensor containing a pair of a light emitting element and a light receiving element disposed to face each other with the feeding path 10 interposed therebetween. The skew detection sensor 39 has two pairs of the transmission type photosensors which are spaced in a direction perpendicular to the feeding path 10. The skew detection sensors 39 are arranged substantially at the same positions as the sheet detection sensors 35 in the feeding path 10. Thus, the skew detection sensors 39 can also serve as the sheet detection sensors 35. If the skew detection sensors 39 are shielded by the front end of the sheet 100 substantially at the same time, the control unit 6 determines that the skew feeding of the sheet 100 does not occur. If the skew detection sensors 39 are shielded by the front end of the sheet 100 with a certain time difference, the control unit 6 determines that the skew feeding occurs.

If the skew feeding of the sheet 100 is detected by the skew detection sensor 39, the control unit 6 controls the belt drive motor (belt drive unit) 41 so as to move the belt 13 in the reverse feeding direction B opposite to the feeding direction F by a predetermined belt reverse feeding amount.

According to this control, when the skew feeding of the sheet 100 is detected, the sheet 100 can be returned to the feeding table 30 (that is, the original feeding start position), because the skew feeding is one of abnormal states upon the feeding of the sheet 100.

When the sheet 100 returns to the feeding table 30 (that is, returns to the original feeding start position), the control unit 6 controls the belt drive motor (belt drive unit) 41 so as to execute the normal feeding. However, if the skew feeding of the sheet 100 is detected again, the control unit 6 controls the belt drive motor (belt drive unit) 41 so as to repeat the reverse feeding. According to this control, the feeding operation can be executed again. By executing the feeding operation again, a possibility that the feeding operation is finally completed becomes high.

If a suction of the sheet 100 is detected by the suction detection sensor 33, the control unit 6 can control the feeding table lift motor (lift driving unit) 42 so as to repeat slight ascending and descending of the feeding table 30 (for example, about 5 mm). According to this control, since it is easy for air blowing from the separation blowing unit 31 to reach the sheet 100, the separation action of the sheet 100 can be promoted.

When repeating the first recovery operation or the second recovery operation, the control unit 6 can control the belt drive motor 41 so as to lengthen a feeding start time until the feeding of the sheet 100 starts after the suction of the sheet 100 is detected. According to this control, when a next sheet 100 is adhered to a sucked sheet 100, a postponement time for detachment of an adhered sheet 100 is provided, so that the separation action of the sheet 100 can be promoted.

In the first recovery operation and the second recovery operation, the control unit 6 can control the recovery operation so as to be executed only once by setting the predetermined number A to 2 in order to recover to the normal state. However, by setting the predetermined number A to 3 or more and controlling so as to repeat the recovery operation multiple times, a possibility of the recovery to the normal state can be further enhanced.

As described above, the feeding device 7 according to the present disclosure has following excellent effects.

(1) A feeding device 7 comprises a suction feeding unit 8 having a belt 13 for feeding a sheet 100 on a feeding table 30 along a feeding path 10 in a suction state, and a belt drive unit 41 for moving said belt 13; a sheet detection sensor 35 that is provided in said feeding path 10 in a downstream of said suction feeding unit 8 and detects presence or absence of the sheet 100; and a control unit 6 for controlling said belt drive unit 41. The control unit 6 controls said belt, drive unit 41 so as to execute a first operation of moving said belt 13 in a feeding direction F at a first speed by a belt feeding amount capable of feeding said sheet 100 from said feeding table 30 to said sheet detection sensor 35. If the first operation is executed and an arrival of said sheet 100 cannot be detected by said sheet detection sensor 35, said control unit 6 controls said belt drive unit 41 so as to execute a low-speed feeding of moving said belt 13 in the feeding direction F at a second speed lower than the first speed by the belt feeding amount or so as to execute a reverse feeding of moving said belt 13 in a reverse feeding direction B opposite to the feeding direction F by a belt, reverse feeding amount capable of feeding said sheet 100 up to said feeding table 30. Thereby, if any abnormal state occurs upon feeding of the sheet 100, the abnormal state in the feeding can be recovered to a normal state by feeding the sheet 100 with a sheet feeding force enhanced by the low-speed feeding or by returning the sheet 100 by the reverse feeding finally to the original feeding start position.

(2) The control unit 6, if the low-speed feeding is executed and an arrival of said sheet 100 cannot be detected by said sheet detection sensor 35, controls said belt drive unit 41 so as to execute the reverse feeding. Thereby, even if any abnormal state occurs upon feeding of the sheet 100, the abnormal state can be easily recovered to the normal state by returning the sheet 100 to the feeding table 30 (that is, the original feeding start position) finally.

(3) The control unit 6 controls said belt drive unit 41 so as to repeat the low-speed feeding after executing said first operation and then further said reverse feeding or so as to repeat said reverse feeding after executing said low-speed feeding. Thereby, the feeding operation can be continued.

(4) The control unit 6 controls said belt drive unit 41 to execute said low-speed feeding after said reverse feeding. Thereby, the sheet feeding force is enhanced so that there is a high possibility that the feeding is finally completed by returning from the abnormal state in the feeding to the normal state.

(5) The control unit 6 controls said belt drive unit 41 so as to repeat executing said low-speed feeding after executing said reverse feeding. Thereby, the feeding operation can be continued.

(6) The feeding device 7 further comprises sheet position detection sensors 36, 37 that are provided in the upstream of said sheet detection sensor 35 in said feeding path and detects a position of a front end of said sheet 100, wherein said control unit 6 controls said belt drive unit 41 so as to reduce said belt reverse feeding amount depending on the position of said sheet 100 detected by said sheet position detection sensors 36, 37 and move said belt 13 in the reverse feeding direction B. Thereby, since the sheet feeding force is enhanced by feeding the sheet 100 in the reverse direction and then feeding the sheet 100 from the original feeding start position in the feeding direction F at the low second speed, there is a high possibility that the feeding is finally completed by returning from the abnormal state in the feeding to the normal state.

(7) The control unit 6 controls said belt drive unit 41 so as to move said belt 13 in a reverse feeding direction B at a third speed lower than said first speed. Thereby, the sheet feeding force upon the reverse feeding can be enhanced.

(8) The control unit 6 changed said second speed depending on a size and/or basis weight of said sheet 100. Thereby, the sheet can be stably fed upon the low-speed feeding.

(9) The control unit 6 changes the third speed depending on the size and/or basis weight of the sheet. Thereby, the sheet 100 can be stably fed upon the reverse feeding.

(10) The control unit 6 controls said belt drive unit 41 so as to increase said belt feeding amount as said repetition number increases. Thereby, the reverse feeding becomes unnecessary, thereby shortening a time required for the feeding operation.

(11) The feeding device further comprises a lift driving unit 42, wherein said feeding table 30 can be lifted up/down by said lift driving unit 42 and said control unit 6, when moving said belt 13 in the reverse feeding direction B, controls said lift driving unit 42 so as to descend said feeding table 30. Thereby, the rear end of the sheet 100 can be prevented from coming into contact with the upper limit sensor 32.

(12) A feeding device comprises a suction feeding unit 8 having a belt 13 for feeding a sheet 100 on a feeding table 30 along a feeding path 10 in a suction state, and a belt drive unit 41 for moving said belt 13; a skew detection sensor 39 that is provided in said feeding path 10 in a downstream of said suction feeding unit 8 and detects presence or absence of a skewed state of said sheet 100; and a control unit 6 for controlling said belt drive unit 41. The control unit 6 controls said belt drive unit 41 so as to execute a first operation of moving said belt 13 in a feeding direction F at a first speed by a belt feeding amount capable of feeding said sheet, from said feeding table 30 to said skew detection sensor 39. The control unit 6, if the skewed state of said sheet 100 is detected by said skew detection sensor 39, controls said belt drive unit 41 so as to execute a reverse feeding of moving said belt 13 in a reverse feeding direction B opposite to the feeding direction F by a belt reverse feeding amount capable of feeding said sheet 13 detected as being in the skewed state up to said feeding table 30. Thereby, the feeding operation can be executed again, and by executing the feeding operation again, there is a high possibility that the feeding is finally completed.

(13) The control unit 6 controls said belt drive unit 41 so as to repeat said first operation after executing said reverse feeding or so as to repeat a second operation of moving said belt 13 in the feeding direction F at a second speed lower than said first speed after executing said reverse feeding. Thereby, the feeding operation can be executed again, and by executing the feeding operation again, there is a high possibility that the feeding is finally completed.

(14) A sheet processing device 1 comprises a feeding device 7 described above and a sheet processing unit 21 for executing a predetermined processing on a sheet 100 supplied by said feeding device 7. Thereby, even if any abnormal state occurs upon feeding of the sheet 100, the abnormal state can be easily recovered by enhancing the sheet feeding force or by returning the sheet to the original feeding start position.

Although specific embodiments of the present invention have been described above, the present invention is not restricted to the above-described embodiments but may be modified and executed in various ways within the scope of the present invention. Further, an embodiment in which contents described in the above embodiments are suitably combined may be one embodiment of the present invention.

Although the control unit 6 controls the belt drive motor 41 so as to move the belt 13 at the third speed as the reverse feeding speed, the control unit 6 may control the belt drive motor 41 so as to move the belt 13 in the reverse feeding direction B at the first speed as the reverse feeding speed.

Since the sheet detection sensor 35 is provided between the feeding roller 4 located in the upstream of the first processing unit 21 and the first processing unit 21, the detection by the sheet detection sensor 35 is executed in a state in which the sheet 100 is nipped by the feeding roller 4 having a higher sheet, feeding force than the suction feeding unit 8. By the way, when the sheet 100 needs to be processed at a predetermined processing timing in the processing by the first processing unit 21, the processing timing is adjusted based on a position of the front end of the sheet 100 detected by the sheet detection sensor 35. That is, since the sheet 100 detected by the sheet detection sensor 35 is fed toward the first processing unit 21 by the feeding roller 4 having a high sheet feeding force, it is possible to process at the predetermined processing timing in accordance with a processing position of the sheet 100, and to suppress occurrence of a deviation of the processing position.

Although if NO in step S47, the control unit 6 controls so as to terminate as the reverse feeding due to the error, the control unit 6 may control as follows. If the control unit 6 determines that the first sheet position detection sensor 36 is not shielded (NO in step S47), the control unit 6 regards that the front end of the sheet 100 is located in the downstream of the first sheet position detection sensor 36 (that is, the sheet 100 has not returned to the original feeding start position) and terminates as the reverse feeding due to the error (step S49). That is, when the control unit 6 determines that the first sheet position detection sensor 36 passes no light, the control unit 6 may control so as to repeat the reverse feeding, for example, up to three times and if the first sheet position detection sensor 36 passes no light despite three reverse feedings, the control unit 6 may control so as to terminate as the reverse feeding due to the error.

What is claimed is:

1. A feeding device comprising:
a suction feeding unit having a belt for feeding an uppermost sheet on a feeding table along a feeding path in a suction state, and a belt drive unit for moving said belt;
a sheet detection sensor that is provided in said feeding path downstream of said suction feeding unit and detects presence or absence of the uppermost sheet; and
a control unit for controlling said belt drive unit,
wherein said control unit controls said belt drive unit so as to execute a first operation of moving said belt in a feeding direction at a first speed by a belt feeding amount capable of feeding said uppermost sheet fed by the belt in the suction state, from said feeding table to said sheet detection sensor,
wherein when said first operation is executed and an arrival of said uppermost sheet fed by the belt in the suction state is not detected by said sheet detection sensor, said control unit controls said belt drive unit so as to execute a low-speed feeding of moving said belt in said feeding direction at a second speed lower than said first speed by said belt feeding amount and so as to execute a reverse feeding of moving said belt in a reverse feeding direction opposite to said feeding direction by a belt reverse feeding amount capable of reverse feeding said uppermost sheet fed by the belt in the suction state to a feeding start position at said feeding table, and
wherein said control unit controls said belt drive unit to execute said low-speed feeding after said reverse feeding, and
wherein said belt reverse feeding amount is corresponding to a separation distance between an original feeding start position where a front end of the uppermost sheet is restricted by abutting against a front end restriction surface of a front stopper provided on the feeding table, and a position of the sheet detection sensor, so that the front end of the uppermost sheet after said reverse feeding is returned further upstream of said feeding path than the original feeding start position.

2. The feeding device according to claim 1,
wherein said control unit controls said belt drive unit so as to repeat executing said low-speed feeding after executing said reverse feeding.

3. The feeding device according to claim 1, further comprising:
sheet position detection sensors that are provided upstream of said sheet detection sensor in said feeding path and detect a position of the front end of said sheet fed by the belt in the suction state,
wherein said control unit controls said belt drive unit so as to reduce said belt reverse feeding amount depending on the position of said uppermost sheet detected by said sheet position detection sensors and move said belt in the reverse feeding direction.

4. The feeding device according to claim 1, wherein said control unit controls said belt drive unit so as to move said belt in the reverse feeding direction at a third speed lower than said first speed.

5. The feeding device according to claim 1, wherein said control unit changes said second speed depending on a size and/or basis weight of said uppermost sheet.

6. The feeding device according to claim 4, wherein said control unit changes said third speed depending on a size and/or basis weight of said uppermost sheet.

7. The feeding device according to claim 2, wherein said control unit controls said belt drive unit so as to increase said belt feeding amount as said repetition number increases.

8. The feeding device according to claim 1, further comprising:
a lift driving unit,
wherein said feeding table can be lifted up/down by said lift driving unit and said control unit, when moving said belt in said reverse feeding direction, controls said lift driving unit so as to descend said feeding table.

9. A sheet processing device comprising:
a feeding device according to claim 1; and
a sheet processing unit for executing a predetermined processing on a sheet supplied by said feeding device.

10. A feeding device comprising:
a suction feeding unit having a belt for feeding an uppermost sheet on a feeding table along a feeding path in a suction state, and a belt drive unit for moving said belt;
a sheet detection sensor that is provided in said feeding path downstream of said suction feeding unit and detects presence or absence of the uppermost sheet; and
a control unit for controlling said belt drive unit,
wherein said control unit controls said belt drive unit so as to execute a first operation of moving said belt in a feeding direction at a first speed by a belt feeding amount capable of feeding said uppermost sheet fed by the belt in the suction state, from said feeding table to said sheet detection sensor,
wherein when said first operation is executed and an arrival of said uppermost sheet fed by the belt in the suction state is not detected by said sheet detection sensor, said control unit controls said belt drive unit so as to execute a low-speed feeding of moving said belt in said feeding direction at a second speed lower than said first speed by said belt feeding amount and so as to execute a reverse feeding of moving said belt in a reverse feeding direction opposite to said feeding direction by a belt reverse feeding amount capable of reverse feeding said uppermost sheet fed by the belt in the suction state to a feeding start position at said feeding table, and
wherein said control unit controls said belt drive unit to execute said reverse feeding after said low-speed feeding, and
wherein said belt reverse feeding amount is corresponding to a separation distance between an original feeding start position where a front end of the uppermost sheet is restricted by abutting against a front end restriction surface of a front stopper provided on the feeding table, and a position of the sheet detection sensor, so that the front end of the uppermost sheet after said reverse feeding is returned further upstream of said feeding path than the original feeding start position.

11. The feeding device according to claim 10, wherein when said low-speed feeding is executed and an arrival of said uppermost sheet fed by the belt in the suction state is not detected by said sheet detection sensor, said control unit controls said belt drive unit so as to execute said reverse feeding.

12. The feeding device according to claim 10, further comprising:
sheet position detection sensors that are provided upstream of said sheet detection sensor in said feeding path and detect a position of the front end of said sheet fed by the belt in the suction state,
wherein said control unit controls said belt drive unit so as to reduce said belt reverse feeding amount depending on the position of said uppermost sheet detected by said sheet position detection sensors and move said belt in the reverse feeding direction.

13. The feeding device according to claim 10, wherein said control unit controls said belt drive unit so as to move said belt in the reverse feeding direction at a third speed lower than said first speed.

14. The feeding device according to claim 10, wherein said control unit changes said second speed depending on a size and/or basis weight of said uppermost sheet.

15. The feeding device according to claim 12, wherein said control unit changes said third speed depending on a size and/or basis weight of said uppermost sheet.

16. The feeding device according to claim 11, wherein said control unit controls said belt drive unit so as to repeat executing said low-speed feeding after executing said reverse feeding, and said control unit controls said belt drive unit so as to increase said belt feeding amount as said repetition number increases.

17. The feeding device according to claim 10, further comprising:
a lift driving unit,
wherein said feeding table can be lifted up/down by said lift driving unit and said control unit, when moving said belt in the reverse feeding direction, controls said lift driving unit so as to descend said feeding table.

18. A sheet processing device comprising:
a feeding device according to claim 10; and
a sheet processing unit for executing a predetermined processing on a sheet supplied by said feeding device.

19. A feeding device comprising:
a suction feeding unit having a belt for feeding an uppermost sheet on a feeding table along a feeding path in a suction state, and a belt drive unit for moving said belt;
a sheet detection sensor that is provided in said feeding path downstream of said suction feeding unit and detects presence or absence of the uppermost sheet; and
a control unit for controlling said belt drive unit,
wherein said control unit controls said belt drive unit so as to execute a first operation of moving said belt in a feeding direction at a first speed by a belt feeding amount capable of feeding said uppermost sheet fed by the belt in the suction state, from said feeding table to said sheet detection sensor,
wherein when said first operation is executed and an arrival of said uppermost sheet fed by the belt in the suction state is not detected by said sheet detection sensor, said control unit controls said belt drive unit so as to execute a low-speed feeding of moving said belt in said feeding direction at a second speed lower than said first speed by said belt feeding amount and so as to execute a reverse feeding of moving said belt in a reverse feeding direction opposite to said feeding direction by a belt reverse feeding amount capable of feeding said uppermost sheet fed by the belt in the suction state to a feeding start position at said feeding table, and wherein said control unit controls said belt drive unit to execute said reverse feeding after said low-speed feeding, wherein said control unit controls said belt drive unit so as to repeat said low-speed feeding after executing said first operation and then further said reverse feeding or so as to repeat said reverse feeding after executing said low-speed feeding.

\* \* \* \* \*